(12) United States Patent
Nilsson

(10) Patent No.: US 9,452,724 B2
(45) Date of Patent: Sep. 27, 2016

(54) BUMPER BEAM

(71) Applicant: Gestamp Hardtech AB, Lulea (SE)

(72) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 15 days.

(21) Appl. No.: 14/770,506

(22) PCT Filed: Mar. 5, 2014

(86) PCT No.: PCT/SE2014/050270
§ 371 (c)(1),
(2) Date: Aug. 26, 2015

(87) PCT Pub. No.: WO2014/142733
PCT Pub. Date: Sep. 18, 2014

(65) Prior Publication Data
US 2016/0009236 A1    Jan. 14, 2016

(30) Foreign Application Priority Data

Mar. 13, 2013   (SE) ....................................... 1300187

(51) Int. Cl.
*B60R 19/02* (2006.01)
*B60R 19/44* (2006.01)
*B60R 19/18* (2006.01)

(52) U.S. Cl.
CPC ............... *B60R 19/44* (2013.01); *B60R 19/18* (2013.01); *B60R 2019/1813* (2013.01); *B60R 2019/1886* (2013.01)

(58) Field of Classification Search
CPC ............... B60R 19/023; B60R 19/18; B60R 2019/1813
USPC ....................................................... 293/120
See application file for complete search history.

(56) References Cited

U.S. PATENT DOCUMENTS

| | | | |
|---|---|---|---|
| 6,726,258 B1* | 4/2004 | Sundgren et al. | 293/102 |
| 6,863,321 B2* | 3/2005 | Jonsson et al. | 293/102 |
| 8,246,090 B2* | 8/2012 | Loveborn | 293/102 |
| 8,967,687 B2* | 3/2015 | Kosaka et al. | 293/155 |
| 2002/0069609 A1* | 6/2002 | Nees et al. | 52/735.1 |
| 2002/0121797 A1* | 9/2002 | Jonsson | B60J 5/0444 296/146.6 |
| 2004/0168862 A1* | 9/2004 | Greenaway | B66B 13/303 187/313 |
| 2005/0213478 A1* | 9/2005 | Glasgow | B60R 19/18 369/262 |
| 2005/0269823 A1 | 12/2005 | Devoursney et al. | |
| 2006/0028032 A1* | 2/2006 | Henseleit | 293/102 |
| 2007/0210590 A1* | 9/2007 | Gouillart | B60R 19/18 293/102 |
| 2007/0257497 A1* | 11/2007 | Heatherington | B60R 19/18 293/120 |
| 2009/0273197 A1* | 11/2009 | Muskos | 293/132 |
| 2009/0295177 A1* | 12/2009 | Asplund | B60R 19/18 293/132 |

(Continued)

FOREIGN PATENT DOCUMENTS

| | | |
|---|---|---|
| DE | 202005014944 | 12/2005 |
| EP | 1027231 | 8/2000 |

(Continued)

OTHER PUBLICATIONS

Machine translation of JP '834.*

*Primary Examiner* — H Gutman
(74) *Attorney, Agent, or Firm* — Mark P. Stone

(57) ABSTRACT

A bumper beam has a hat-shaped profile (11) with a cover (12) which is recessed into the hat-shaped profile and is welded to the sides (16, 17) of the hat-shaped profile, inside the hat-shaped profile.

8 Claims, 3 Drawing Sheets

(56) References Cited

U.S. PATENT DOCUMENTS

| | | | |
|---|---|---|---|
| 2010/0133859 A1* | 6/2010 | Lutke-Bexten et al. | 293/102 |
| 2012/0104779 A1* | 5/2012 | Handing et al. | 293/155 |
| 2013/0057000 A1* | 3/2013 | Patschicke et al. | 293/133 |
| 2014/0117685 A1* | 5/2014 | Honda et al. | 293/120 |
| 2015/0102614 A1* | 4/2015 | Arns | 293/102 |
| 2015/0232050 A1* | 8/2015 | Yamada | B60R 19/34 296/187.1 |
| 2016/0001724 A1* | 1/2016 | Nilsson | B60R 19/24 293/154 |

FOREIGN PATENT DOCUMENTS

| | | | |
|---|---|---|---|
| EP | 1873019 A2 * | 1/2008 | |
| JP | 2004074834 A * | 3/2004 | |
| WO | WO 02/04240 | 1/2002 | |
| WO | WO 0238418 A1 * | 5/2002 | |

* cited by examiner

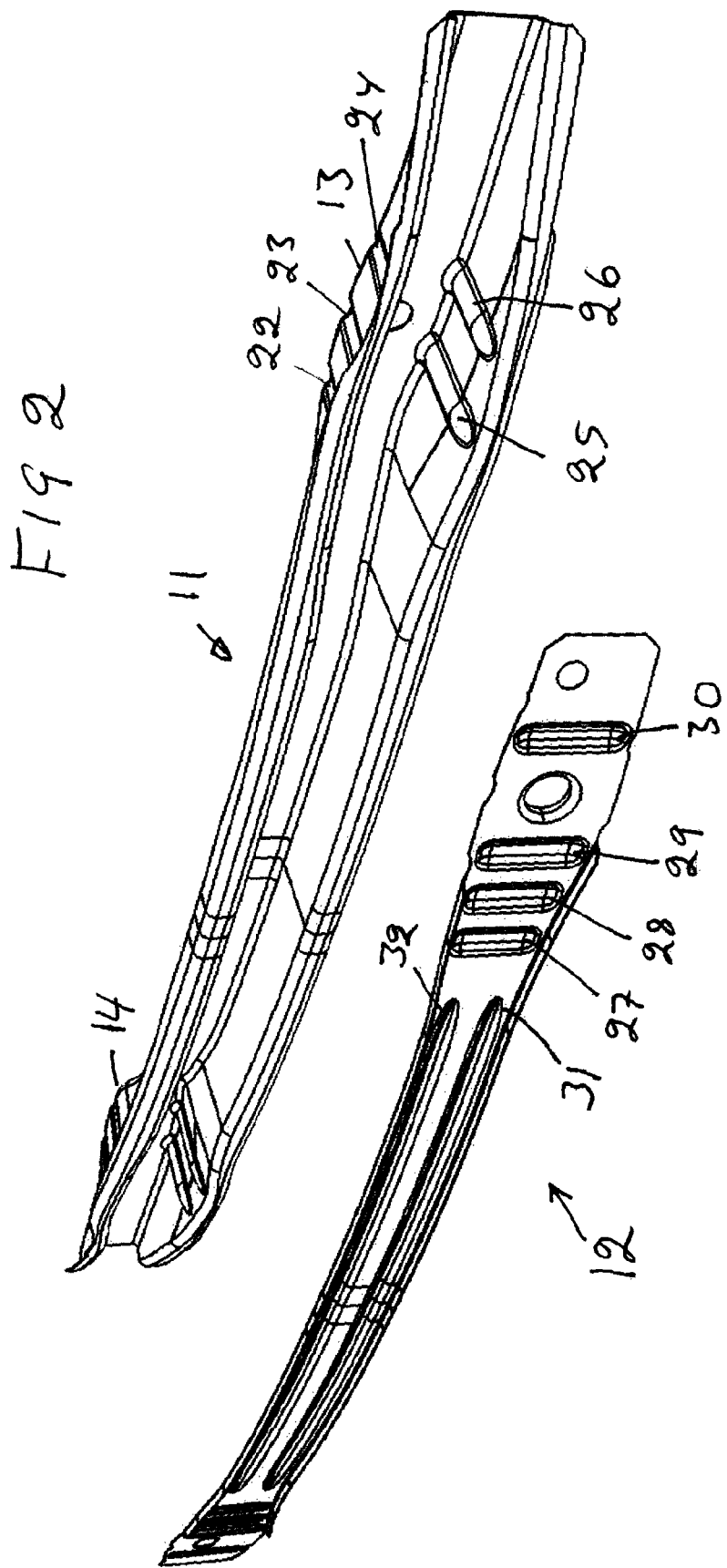

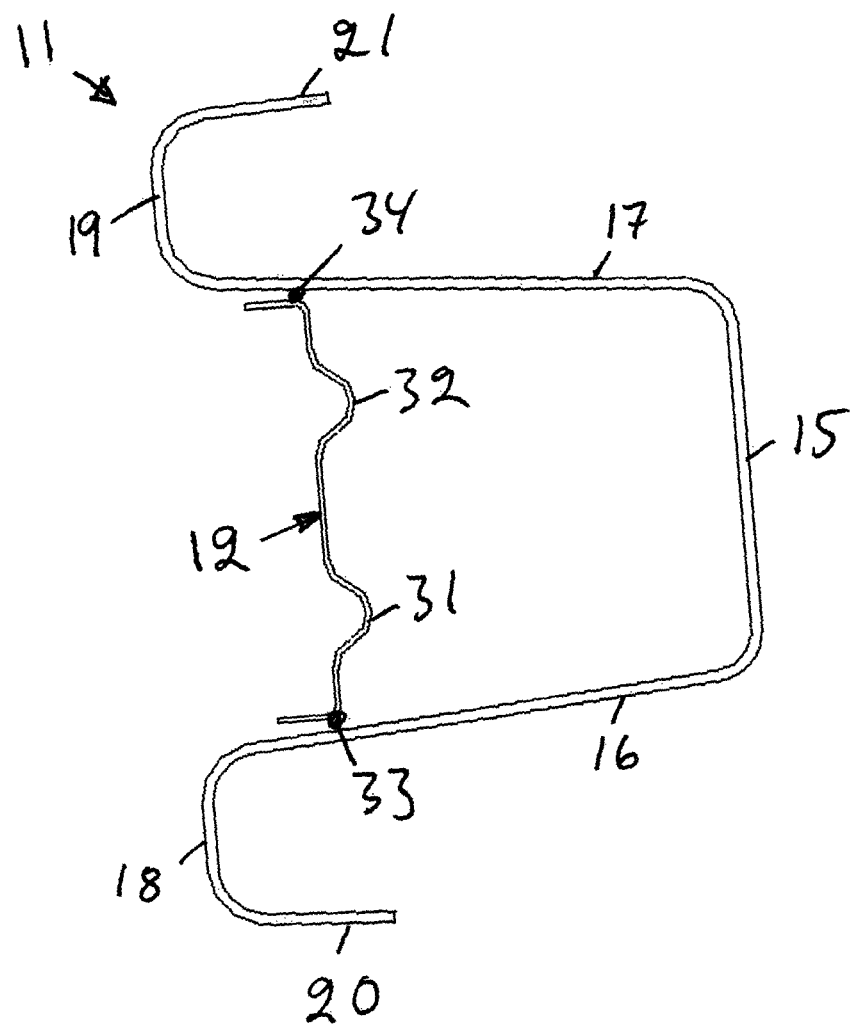

BUMPER BEAM

AREA OF TECHNOLOGY OF THE INVENTION

The invention relates to a bumper beam having a hat-shaped profile, with a central flange and sides which have side flanges, wherein the central flange faces inward toward the vehicle, and the side flanges face outward from the vehicle, and the hat-shaped profile has a cover which is recessed into the hat-shaped profile and gives it a closed profile.

BACKGROUND OF THE INVENTION

EP1027231 illustrates such a bumper beam which has a cover which is welded to the flanges of the hat-shaped beam and is bent down into the hat-shaped profile in order to accommodate an energy-absorbing foam body.

OBJECT OF THE INVENTION

An object of the invention is to control the deformation behaviour when collision stress is experienced.

BRIEF DESCRIPTION OF THE INVENTION

According to the invention, the cover is welded to the sides of the hat-shaped profile, inside the profile. As a result of this, the cover stiffens the beam cross section and prevents collapse of the sides of the beam. The invention is defined by the claims.

BRIEF DESCRIPTION OF THE DRAWINGS

FIG. 2 shows the bumper beam according to FIG. 1, with its two elements separated; and FIG. 3 is a cross section through line 3 in FIG. 1.

DESCRIPTION OF A THE ILLUSTRATED AND PREFERRED EMBODIMENT OF THE INVENTION

Figure 1:
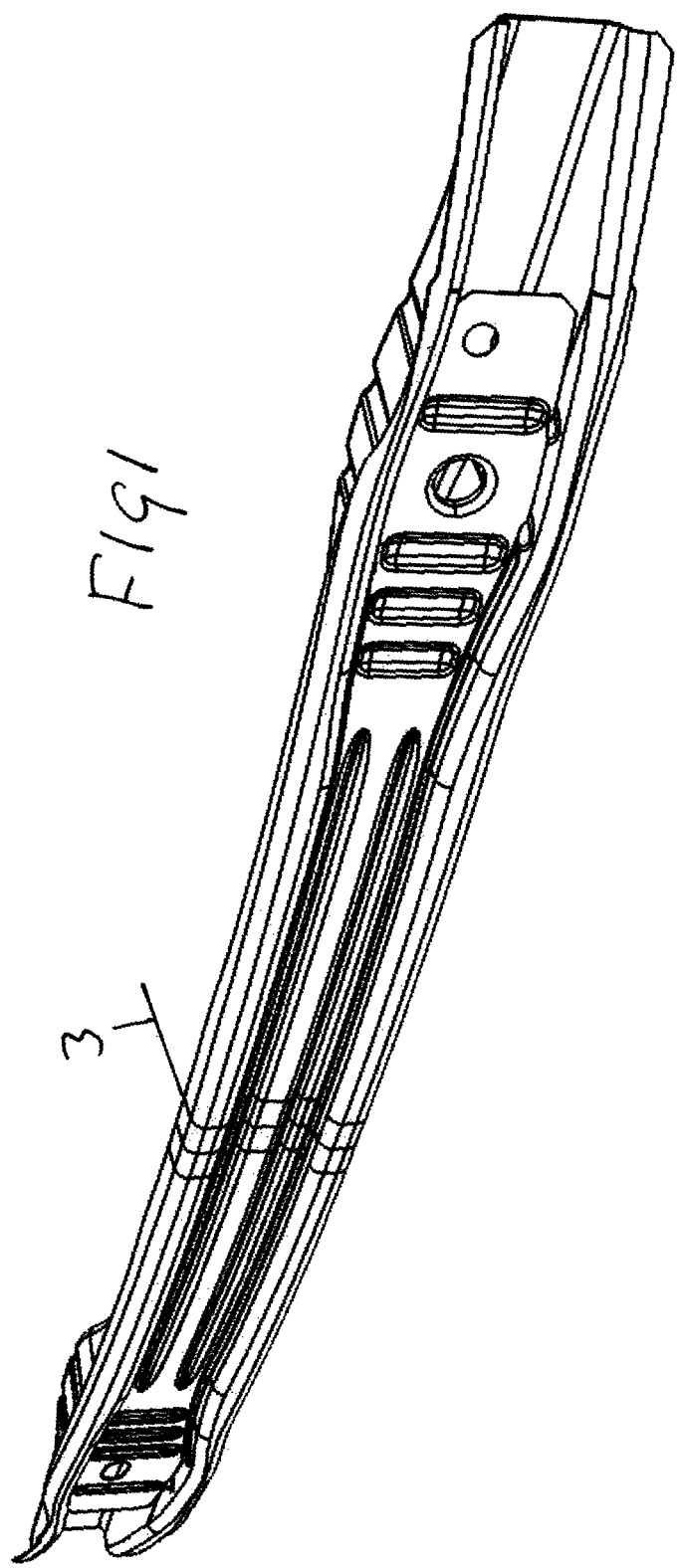
FIG. 1 is an isometric view of a bumper beam, illustrating an exemplary embodiment of the invention.

The bumper beam of metal comprises a hat-shaped profile 11 and a cover 12. The hat-shaped profile is curved, and has a cross section which varies along the length of the profile. The profile has two fastening portions 13 and 14 for fastening the bumper beam to the vehicle.

The hat-shaped profile has a central member 15 and side members 16 and 17 which end in side flanges 18 and 19. The side flanges have reverse members 20 and 21. At the fastening portions, the sides of the hat-shaped profile have horizontal depressions 22-26 which extend in the longitudinal direction of the vehicle. The cover has vertical depressions 27-30 at the locations of the fastening portions 13 and 14, and horizontal depressions 31 and 32 between the fastening portions. The various depressions serve to reinforce the bumper beam and to improve its deformation behaviour in the various collision loads which may be experienced. The cover is recessed in the hat-shaped profile and is welded to the sides 16 and 17 inside the hat-shaped profile, with welds 33 and 34. The welds 33 and 34 support the sides 16 and 17 of the hat-shaped profile, and delay buckling of the sides 16 and 17 under collision stresses, and the beam is then deformed in a more advantageous manner, thereby increasing the absorption of energy. This enables use of a higher profile and/or a smaller sheet thickness, thereby saving weight while maintaining performance.

Both the cover and the hat-shaped profile are fabricated from hot-formed or cold-formed steel. Advantageously, the hat-shaped profile can be fabricated using the press-hardening technique, but the cover can be cold formed because the cover need not have as high an ultimate strength as the hat-shaped profile.

The cover does not cover the end regions of the hat-shaped profile beyond the fastening portions; however, alternatively the cover may cover the entire hat-shaped profile.

The invention claimed is:

1. A bumper beam, comprised of a hat-shaped profile (11) with a central flange (15) and sides (16, 17) which sides have side flanges (18, 19), wherein the central flange faces inward toward the vehicle, and the side flanges face outward from the vehicle, and the hat-shaped profile has a cover (12) which is completely recessed into the hat-shaped profile and gives it a closed profile; wherein:
   the cover (12) is welded to the sides inside the hat-shaped profile and arranged such that all portions of the cover are spaced apart from said central flange of said hat-shaped profile.

2. A bumper beam according to claim 1, wherein the hat-shaped profile has two portions (13, 14) near its ends, for fastening to the vehicle, and the cover (12) has vertical depressions (27, 29) at the fastening portions.

3. A bumper beam according to claim 1, wherein the hat-shaped profile has two portions (13, 14) near its ends, for fastening to the vehicle, and the cover has horizontal depressions (31, 32) between the fastening portions.

4. A bumper beam according to claim 1, wherein the sides of the hat-shaped profile have depressions (22-26) at the fastening portions, which depressions are oriented in the longitudinal direction of the vehicle.

5. A bumper beam according to claim 2, wherein the hat-shaped profile has two portions (13, 14) near its ends, for fastening to the vehicle, and the cover has horizontal depressions (31, 32) between the fastening portions.

6. A bumper beam according to claim 2, wherein the sides of the hat-shaped profile have depressions (22-26) at the fastening portions, which depressions are oriented in the longitudinal direction of the vehicle.

7. A bumper beam according to claim 3, wherein the sides of the hat-shaped profile have depressions (22-26) at the fastening portions, which depressions are oriented in the longitudinal direction of the vehicle.

8. A bumper beam according to claim 5, wherein the sides of the hat-shaped profile have depressions (22-26) at the fastening portions, which depressions are oriented in the longitudinal direction of the vehicle.

* * * * *